(12) United States Patent
Zukowski

(10) Patent No.: US 9,251,597 B2
(45) Date of Patent: Feb. 2, 2016

(54) METHOD AND APPARATUS FOR DETECTING A PUPIL

(71) Applicant: CANON KABUSHIKI KAISHA, Tokyo (JP)

(72) Inventor: Kamil Zukowski, Sokółka (PL)

(73) Assignee: Canon Kabushiki Kaisha, Tokyo (JP)

( * ) Notice: Subject to any disclaimer, the term of this patent is extended or adjusted under 35 U.S.C. 154(b) by 145 days.

(21) Appl. No.: 13/950,088

(22) Filed: Jul. 24, 2013

(65) Prior Publication Data

US 2014/0029794 A1    Jan. 30, 2014

(30) Foreign Application Priority Data

Jul. 27, 2012 (EP) .................................. 12178199

(51) Int. Cl.
| | |
|---|---|
| G06K 9/00 | (2006.01) |
| G06T 7/20 | (2006.01) |
| G06K 9/34 | (2006.01) |
| G06K 9/50 | (2006.01) |
| G06T 7/00 | (2006.01) |

(52) U.S. Cl.
CPC .......... *G06T 7/2033* (2013.01); *G06K 9/00604* (2013.01); *G06K 9/346* (2013.01); *G06K 9/50* (2013.01); *G06T 7/0046* (2013.01); *G06T 2207/30041* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 6,005,959 A | 12/1999 | Mohan et al. | |
| 6,229,905 B1 * | 5/2001 | Suzaki | 382/110 |
| 2007/0013652 A1 * | 1/2007 | Kim et al. | 345/156 |
| 2011/0058725 A1 | 3/2011 | Markwardt et al. | |
| 2011/0280454 A1 | 11/2011 | Su et al. | |
| 2012/0249963 A1 * | 10/2012 | Yoshida | 351/208 |

FOREIGN PATENT DOCUMENTS

| | | |
|---|---|---|
| GB | 1328124 A | 8/1973 |
| WO | 2008047315 A1 | 4/2008 |

OTHER PUBLICATIONS

Bradley et al., "Comparison of Colvard Pupillometer and Infrared Digital Photography for Measurement of the Dark-Adapted Pupil Diameter", J Cataract Refract Surg, Nov. 2005, pp. 2129-2132, vol. 31.
Zhu et al., "Robust Pupil Center Detection Using a Curvature Algorithm", Computer Methods and Programs in Biomedicine, 1999, pp. 145-157, vol. 59.
Brown et al., "Day to Day Variability of the Dark—Adapted Pupil Diameter", J Cataract Refract Surg, Mar. 2004, pp. 639-644, vol. 30.

* cited by examiner

*Primary Examiner* — Atiba O Fitzpatrick
(74) *Attorney, Agent, or Firm* — Canon USA Inc., IP Division

(57) ABSTRACT

A method for detecting a pupil in an image of an eye, comprises analyzing the image, exploiting an expected shape of the pupil, to identify portions of the image that are candidate portions of the pupil. A first region of the image, which corresponds to a lower part of the pupil, is analyzed in preference to a second region of the image, which corresponds to an upper part of the pupil, so as to reduce or avoid errors arising from artifacts that tend to be present in said second region of the image. A computer or processor program and an apparatus for performing the method are also disclosed.

13 Claims, 5 Drawing Sheets segmented pupil without artiffacts segmented pupil interfered with eyelashes segmented pupil without artiffacts   segmented pupil interfered with eyelashes

METHOD AND APPARATUS FOR DETECTING A PUPIL

CROSS-REFERENCE TO RELATED APPLICATIONS

The present application claims priority under 35 U.S.C. §119 to European patent application No. EP12178199.1 filed on Jul. 27, 2012 in the European Patent Office. The disclosure of the above application is incorporated herein by reference in its entirety.

BACKGROUND OF THE INVENTION

1. Technical Field

The present invention relates to a method and apparatus for detecting a pupil in an image of an eye, in particular a human eye. Such a method and system can be applied, for example, in a system for eye movement tracking.

2. Background Art

Information regarding the position and/or movement of the pupil can be used for tracking of the position and/or movement of the eye. Reliably and accurately detecting the pupil is important in several fields of medical diagnosis such as in rehabilitation, measurements of human intelligence, and diagnosis and treatment in the field of ophthalmology.

One known system for eye movement tracking comprises a grayscale camera that is used to capture an image of an eye, the captured image then being analyzed to detect the pupil position. The captured image of the eye contains objects, such as an eyelid, interfering with the image of the pupil. It is thus necessary to apply special measures to recover the image of the pupil and its center from the image of the eye.

Such a system and method is disclosed by S. I. Kim et al. in a paper entitled "A Fast Center of Pupil Detection Algorithm for VOG-Based Eye Movement Tracking" (Proc. of the IEEE 2005 Engineering in Medicine and Biology 27th Annual Conference Shanghai, China, Sep. 1-4, 2005). The captured image is initially processed in order to obtain a "binary image". Dark regions of the processed image from the camera (assumed to represent the pupil object) are distinguished from the bright regions (assumed to represent unnecessary data). In such a binary image a feature of interest such as the pupil object may be "segmented" which means that the pixels corresponding to the feature concerned are assigned one value in the binary representation, whereas other pixels not corresponding to the feature are assigned the other binary value. The system recognizes the center of the pupil by searching the largest circle from concentric circles that matches the segmented pupil object.

Unfortunately, a patient's long black eyelashes or false eyelashes can diminish the effectiveness of known pupil detection methods. Image portions representing eyelashes with mascara on the image usually overlap the pupil and are very often identified as part of the pupil. This phenomenon significantly influences the final result, i.e. calculated center is not a correct center of a pupil. That is also harmful to the pupil tracking algorithm, as pupil and eyelashes move with respect to each other.

Moreover, pupil detection based on searching for the largest circle from concentric circles cannot be applied successfully in camera systems that use prismatic split field rangefinders to determine the distance from eye to the camera. The captured image from the camera in such systems is divided into two fields. When the image is out of focus, the two fields of the image are displaced; when in focus, the fields are aligned to form a single image. Therefore, if pupil object is split, it is impossible to use the above solution to find matching circle and center of the pupil.

SUMMARY OF THE INVENTION

A method of detecting a pupil in an image of an eye embodying the present invention comprises analysing the image, exploiting an expected shape of the pupil, to identify portions of the image that are candidate portions of the pupil wherein a first region of the image, which corresponds to a lower part of the pupil, is analysed in preference to a second region of the image, which corresponds to an upper part of the pupil, so as to reduce or avoid errors arising from artifacts that tend to be present in said second region of the image.

Advantageously method further comprises identifying pixels having characteristics consistent with a pupil, searching for a longest line in the image, being the line having the largest number of such identified pixels among lines extending in a predetermined direction in the image, and using the longest line to determine a size and/or position of the pupil.

According to the preferred embodiment a length of the longest line is used to determine a diameter or radius of the pupil, and a centre position of the longest line is used to determine a centre of the pupil.

Advantageously the predetermined direction is the horizontal direction and each said line is a horizontal row.

In a preferred embodiment said longest line is the line having the largest number of consecutive such identified pixels among said lines extending in said predetermined direction in the image.

Advantageously the search is conducted line by line, and continues as long as the number of such identified pixels in the line is increasing.

According to the preferred embodiment search is interrupted when the number of such identified pixels is significantly larger than the number in previous line and the length of the longest line is designated as a length of the last but one searched line.

Advantageously, searching for the longest line in the image is directed only to the longest fragment of the line.

The search is preferably conducted horizontal row by horizontal row, starting in the first region, advantageously starting the search in a horizontal row of the first region that is farthest from the second region and going horizontal row by horizontal row towards the second region.

Alternatively, a method of detecting a pupil in an image of an eye embodying the invention comprises identifying pixels having characteristics consistent with a pupil, searching for a longest line in the image, being the line having the largest number of such identified pixels among lines extending in a predetermined direction in the image, and using the longest line to determine a size and/or position of the pupil.

The predetermined direction need not be the horizontal direction in this case. For example, a vertical direction or a diagonal direction could be used.

According to the preferred embodiment the image is a split image captured by an image capturing device having a split prism rangefinder, and the said predetermined direction coincides with the direction of a split line between the two fields of the split image.

Preferably, said longest line is the line having the largest number of consecutive such identified pixels among said lines extending in said predetermined direction in the image.

In another alternative method of detecting a pupil in an image of an eye embodying the present invention, the image is split into first and second regions, the first region of the image corresponding to a lower part of the pupil and the second region of the image corresponding to an upper part of the pupil, and the method comprises starting from a lowest row of the second region and working upwards row by row, identifying portions of the image that are candidate portions of the pupil; identifying a row at which the identified portions start to decrease in length; and determining a location of the pupil based on the identified row.

Preferably, the location of the pupil is determined based on the identified row and on a center of gravity of the candidate portions of the pupil. Preferably, before determining the center of gravity, the second region is processed to remove therefrom artifacts outside a semicircle above the identified row (assumed to be the diameter), and the processed second region (upper part of the pupil) and the first region (lower part of the pupil) are joined together. The center of gravity is then determined based on the two parts joined together. Instead of removing from the second region artifacts outside the semicircle, it is possible to simply ignore them in the subsequent processing. The first region is not processed to remove artifacts because it is assumed free of artifacts (eyelid, eyelashes, mascara, etc.). This saves processing time.

In the preferred embodiment the image is a split image captured by an image capturing device having a split prism rangefinder, and the first and second regions are the two fields of the split image.

Further, a method of tracking movement of an eye comprises receiving a series of images of the eye using any of the methods according to present invention to detect a pupil in at least two of the images and tracking the movement of the eye based on changes in position of the detected pupil from one image to another.

Further, a method of processing an image of an eye comprises using any of the methods according to present invention to detect a pupil in the image and removing from the image artifacts present therein outside an area occupied by the detected pupil.

An apparatus for detecting a pupil in an image of an eye, according to the invention comprises an analysis unit for analysing the image, exploiting an expected shape of the pupil, to identify portions of the image that are candidate portions of the pupil wherein a first region of the image, which corresponds to a lower part of the pupil, is analysed in preference to a second region of the image, which corresponds to an upper part of the pupil, so as to reduce or avoid errors arising from artifacts that tend to be present in said second region of the image.

Another apparatus for detecting a pupil in an image of an eye, according to the invention comprises means for identifying pixels having characteristics consistent with a pupil, means for searching for a longest line in the image, being the line having the largest number of such identified pixels among lines extending in a predetermined direction in the image, and means for using the longest line to determine a size and/or position of the pupil.

In still another apparatus for detecting a pupil in an image of an eye according to the invention, the image is split into first and second regions, the first region of the image corresponding to a lower part of the pupil and the second region of the image corresponding to an upper part of the pupil, and the apparatus comprises means for starting from a lowest row of the second region, and working upwards row by row, identifying portions of the image that are candidate portions of the pupil, means for identifying a row at which the identified portions start to decrease in length and means for determining a location of the pupil based on the identified row.

A program according to the invention, when executed by a computer or processor, causes the computer or processor to carry out any of the aforementioned methods according to the invention.

Advantage Effect of the Invention

Application of this invention in pupil position detecting systems improves accuracy and reduces sensitivity to any other dark object near the pupil, especially mascara, false eyelashes, etc.

Moreover, a system according to the invention may be easily adapted to cooperation with prismatic split field rangefinders, used for determining distance from eye to the camera.

BRIEF DESCRIPTION OF THE DRAWINGS

Reference will now be made, by way of example, to the accompanying drawings, in which.

DETAILED DESCRIPTION OF THE PREFERRED EMBODIMENTS

In a preferred embodiment of the invention an image capturing apparatus has a movable head and images are taken from an infrared CCD camera attached to the movable head. A person sits or stands in front of the head, so the person's eye can be seen on the images from the camera. Pupil detection is performed on the images from the camera and the current pupil position is used by the apparatus to compensate for any eye movements and keep the movable head in a desired position—usually directly in front of the eye (so that the eye is in the center of the camera image).

In the present embodiment the pupil is assumed to be a circular object. Therefore the solution of the problem of detection is to find a circle (center and radius) that can fit the shape on the image (candidate pupil parts). Then, if desired, any part of image outside this circle can be assumed to be an artifact or interfering object (e.g. image of eyelashes), and removal processing can be applied to remove such parts.

The present inventor realised that in most cases the problem of interferences (eyelashes) concerns the image region corresponding to the upper part of the pupil. Therefore in the present embodiment it is assumed that the image region corresponding to the lower part of pupil object is correct. Accordingly, in the present embodiment the region of the image (first region) which corresponds to a lower part of the pupil is analysed in preference to the region of the image (second region) which corresponds to an upper part of the pupil, so as to reduce or avoid errors arising from artifacts that tend to be present in the second region of the image.

Referring now to FIG. 2 and FIGS. 3(a) to 3(f), the procedure of finding center and diameter/radius of the circle in the present embodiment starts in step S1 by finding the bottom row of the image in which at least one candidate part of the pupil is present. In the present embodiment, consecutive bright pixels in a row are considered as candidate pupil parts. This bottom row is made the current row.

In step S2 the width of the candidate pupil part—for example the number of consecutive bright pixels (length of the row)—is calculated for this row.

Figure 3:
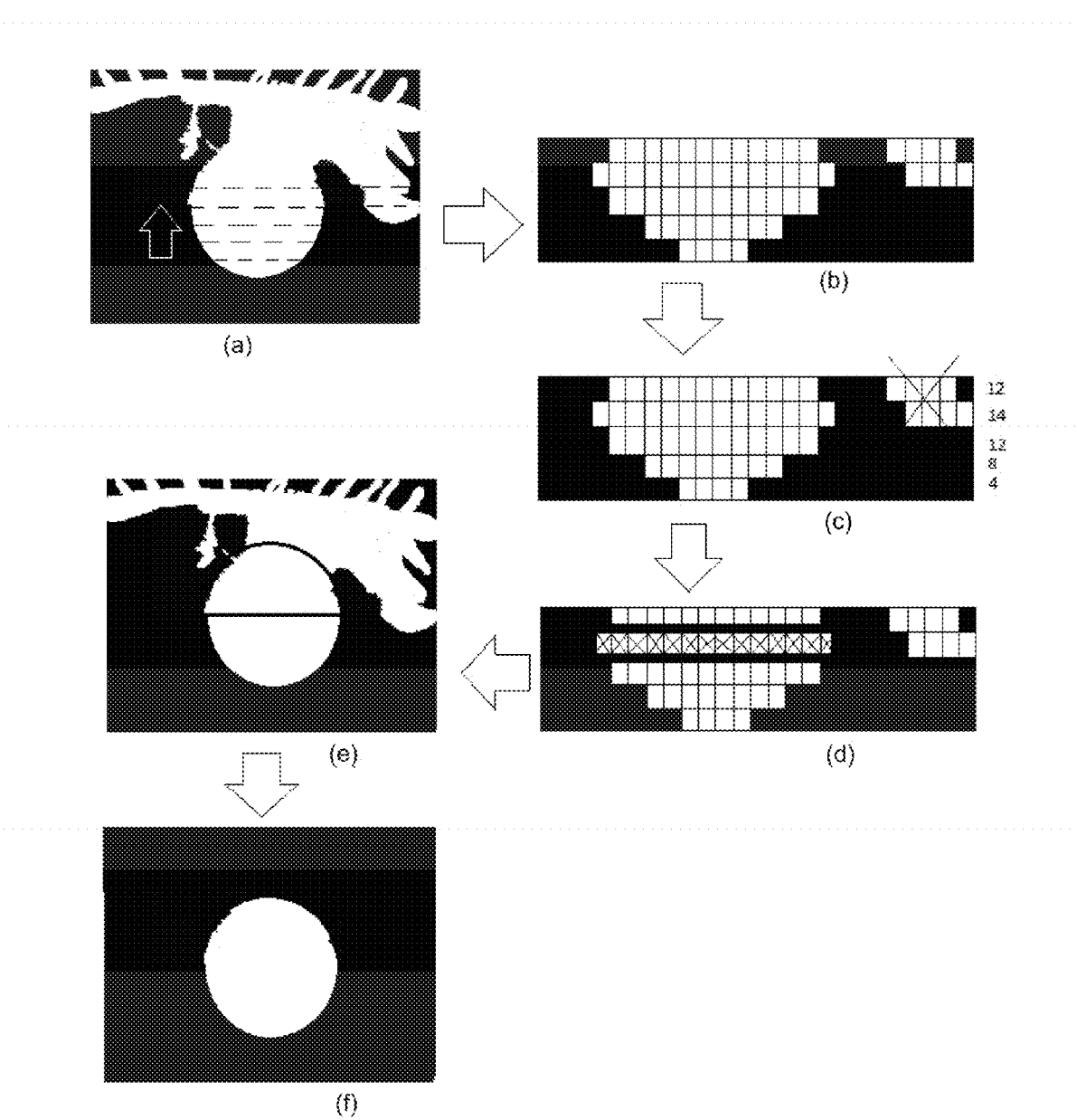
FIGS. 3(a) to 3(f) present example images and image portions for use in explaining steps of the method of FIG. 2.
Figure 4:
FIG. 4 illustrates an image region corresponding to an upper part of the pupil, which is the target of an optional removal procedure in the FIG. 2 method.

Note that if any row is fragmented, only the longest fragment is considered (see FIG. 3(c)). Also, in the present embodiment, a fragment is made up of consecutive bright pixels. However, in other embodiments of the present invention it is possible to tolerate small gaps between bright pixels in a fragment. For example, a fragment could be recognized as ending only when N successive dark pixels are found, where N is a tolerance value (N is an integer greater than or equal to 2).

Next, in step S3 the width of the candidate pupil part (length of the row) is calculated for the row immediately above the bottom row (see FIGS. 3(a) and 3(b)).

In step S4, it is checked whether the width of the candidate pupil part in the row immediately above the current row is lower than the width of the candidate pupil part in the current row (see FIG. 3(c)—numbers on the right are values of rows' length).

If the outcome of step S4 is "NO", i.e. the width of the candidate pupil part in the row immediately above the current row is greater than or equal to the width of the candidate pupil part in the current row, then in step S5 it is checked whether the width of the candidate pupil part in the row immediately above the current row is significantly larger than the width of the candidate pupil part in the current row. The purpose of this further check is to stop moving up the rows if the width increases significantly (as would happen in FIG. 3(a) when the bright pixels of the eyelid and/or eyelashes join up with the bright pixels of the upper part of the pupil).

If the outcome of step S5 is "YES", then processing is terminated in step S8 as a detection failure ("FAIL").

If the outcome of step S5 is "NO", i.e. the width of the candidate pupil part in the row immediately above the current row is not significantly larger than width of the candidate pupil part in the current row, then in step S6 the row immediately above the current row becomes the new current row, i.e. the processing moves up one row.

In step S7 it is checked whether the current row is the top row of the image. If so, then processing is terminated in step S8 as a detection failure ("FAIL").

If the outcome of step S4 is "YES", i.e. the width of the candidate pupil part in the row immediately above the current row is lower than the width of the candidate pupil part in the current row, then in step S9 it is assumed that the current row coincides with the diameter of the circle that is the target of the procedure (see FIG. 3(d)). Also, the center of the current row is assumed to coincide with the center of the target circle.

In optional step S10, once the diameter and center of the circle are found, they can be used as reference elements to cut off all unnecessary data (see FIG. 3(e)) and procedure of eliminating interferences is completed (see FIG. 3(f)). Step S10 is described in detail later.

The processing then terminates.

Figure 1:
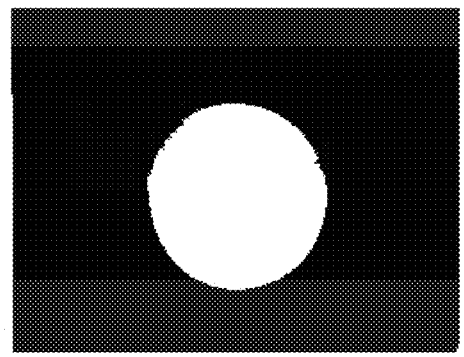
FIG. 1 presents, on the left hand side, an example of a segmented image of a pupil without significant artifacts and, on the right hand side, an example of an image of a pupil affected by artifacts associated with eyelashes.
Figure 1:
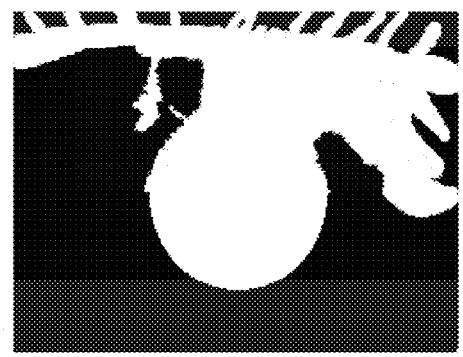
Figure 2:
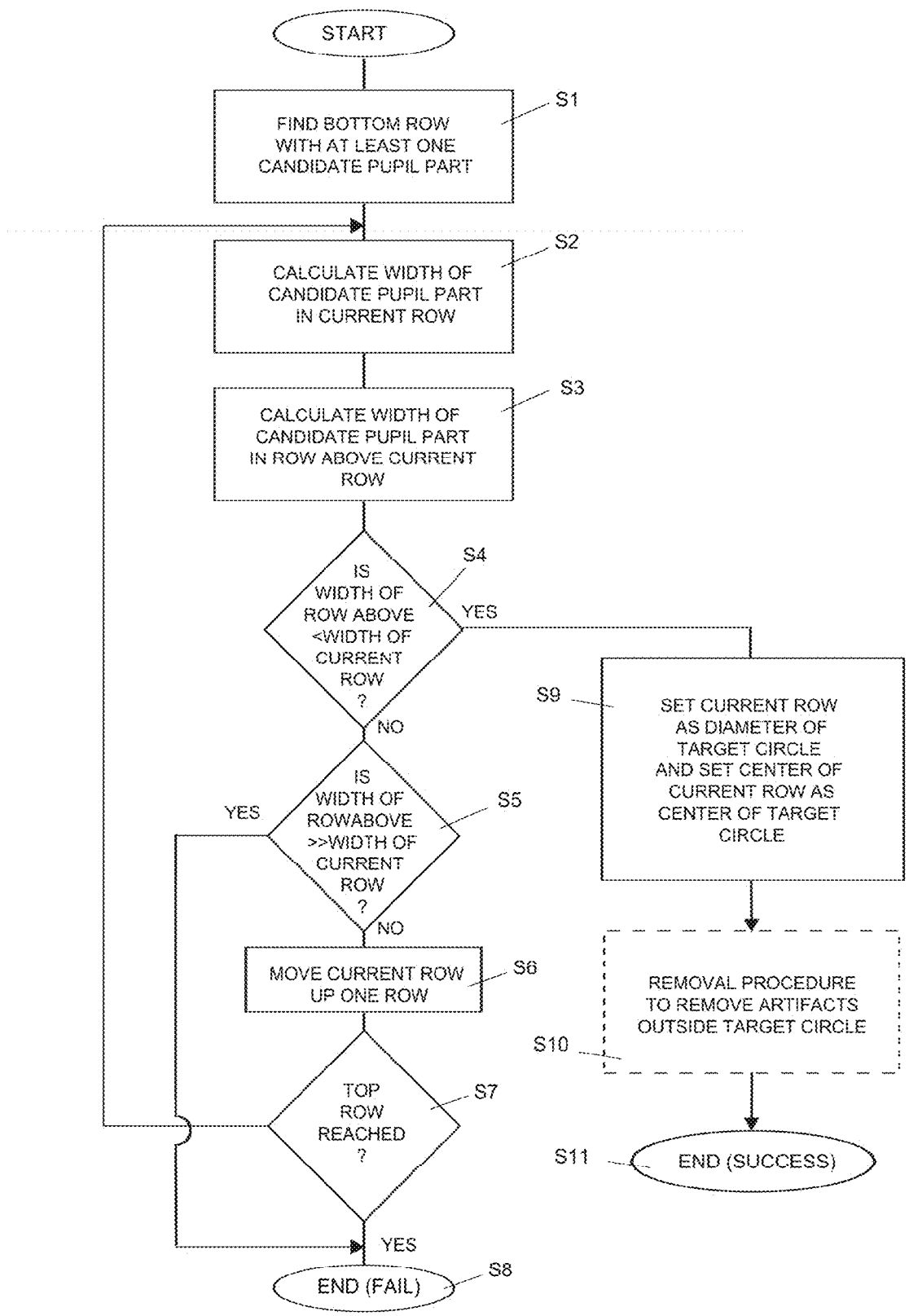
FIG. 2 presents a flowchart for use in explaining a pupil detection method according to a first embodiment of the present invention.

In FIG. 2, if the outcome of step S5 is "YES", then processing is terminated in step S8 as a detection failure ("FAIL"). However, as an alternative it is possible to continue with the processing in the case when the outcome of step S5 is "YES" by jumping to step S9. In this case, the true longest row (true horizontal diameter) is not found but, if the artifacts causing the sudden increase in length are near to the true horizontal diameter, useful results can still be obtained. Also, by using a more sophisticated approach to detect the center of the target circle (for example the center-of-gravity based approach described in connection with the second embodiment below) it is possible to obtain satisfactory results even when the true diameter is not detected by the process of steps S2-S7.

In the first embodiment, as described above, a first region of the image, which corresponds to a lower part of the pupil, is analysed substantially exclusively and substantially no analysis is made of a second region of the image, which corresponds to an upper part of the pupil. This avoids errors arising from artifacts that tend to be present in said second region of the image. The first region is analysed substantially exclusively in the sense that only the bottom line of the second region is analysed (this is the line where the length starts to decrease).

When the first region is analysed exclusively or substantially exclusively, it is not essential for the analysis to search for the longest line. For example, it is possible instead to look for a pattern of pixels in the first region that is a good match for a semicircle. It is also possible to look for an edge in the first region that is a good match for a half-circumference (or even just a sector thereof).

It is not essential to use the first region exclusively or substantially exclusively (and to ignore or substantially ignore the second region entirely). Embodiments of the invention can use the second region to a greater extent than just to find the first row where the length decreases again. For example, it is possible to analyse both regions but give more statistical weight to the first region than to the second region.

As an example, it is possible to look for a pattern of pixels in both regions that is a good match for a full circle but tolerates more mismatches in the second region than in the first region (we expect mismatches to be caused by artifacts in the second region but not in the first region). The prior art method described by S. I. Kim et al., "A Fast Center of Pupil Detection Algorithm for VOG-Based Eye Movement Tracking" (Proc. of the IEEE 2005 Engineering in Medicine and Biology 27th Annual Conference Shanghai, China, Sep. 1-4, 2005), which involves searching for the largest concentric circle that matches can be adapted to tolerate more mismatches in the second region than in the first region.

Another example is to look for an edge in both regions that is a good match for a full circumference but tolerating more mismatches (e.g. small gaps) in the second region than in the first region.

And yet another example is to look for a diameter in a vertical or diagonal direction, allowing small gaps between pixels in the second region but not in the first region or allowing small gaps even in the first region and larger gaps in the second region.

Thus, many embodiments of the present invention can be envisaged that analyse a first region of the image, which corresponds to a lower part of the pupil, in preference to a second region of the image, which corresponds to an upper part of the pupil, so as to reduce or avoid errors arising from artifacts that tend to be present in the second region of the image.

Next, a second embodiment of the present invention will be described with reference to FIG. 7. In the first embodiment a first region of the image, which corresponds to a lower part of the pupil, was analysed in preference to a second region of the image, which corresponds to an upper part of the pupil, so as to reduce or avoid errors arising from artifacts that tend to be present in said second region of the image. The second embodiment takes a different approach and avoids analysing the first region and instead analyses only the second region.

It is assumed that the image to be processed in the second embodiment contains an already segmented pupil object (interfered with eyelashes) in or close to the middle of the image.

In such implementation, the image is split along a horizontal dividing line into the first and second regions. For example, the image may be split into two halves: upper and lower (second region and first region respectively). In an image capturing apparatus having a prism-split mechanism (known from prior art) the captured image itself already has upper and lower fields on opposite sides respectively of the split line of the prism-split system. These upper and lower fields can be used directly as the second and first regions.

Next, it is assumed that first region (lower half) is not affected by artifacts and is not analyzed.

Figure 7:
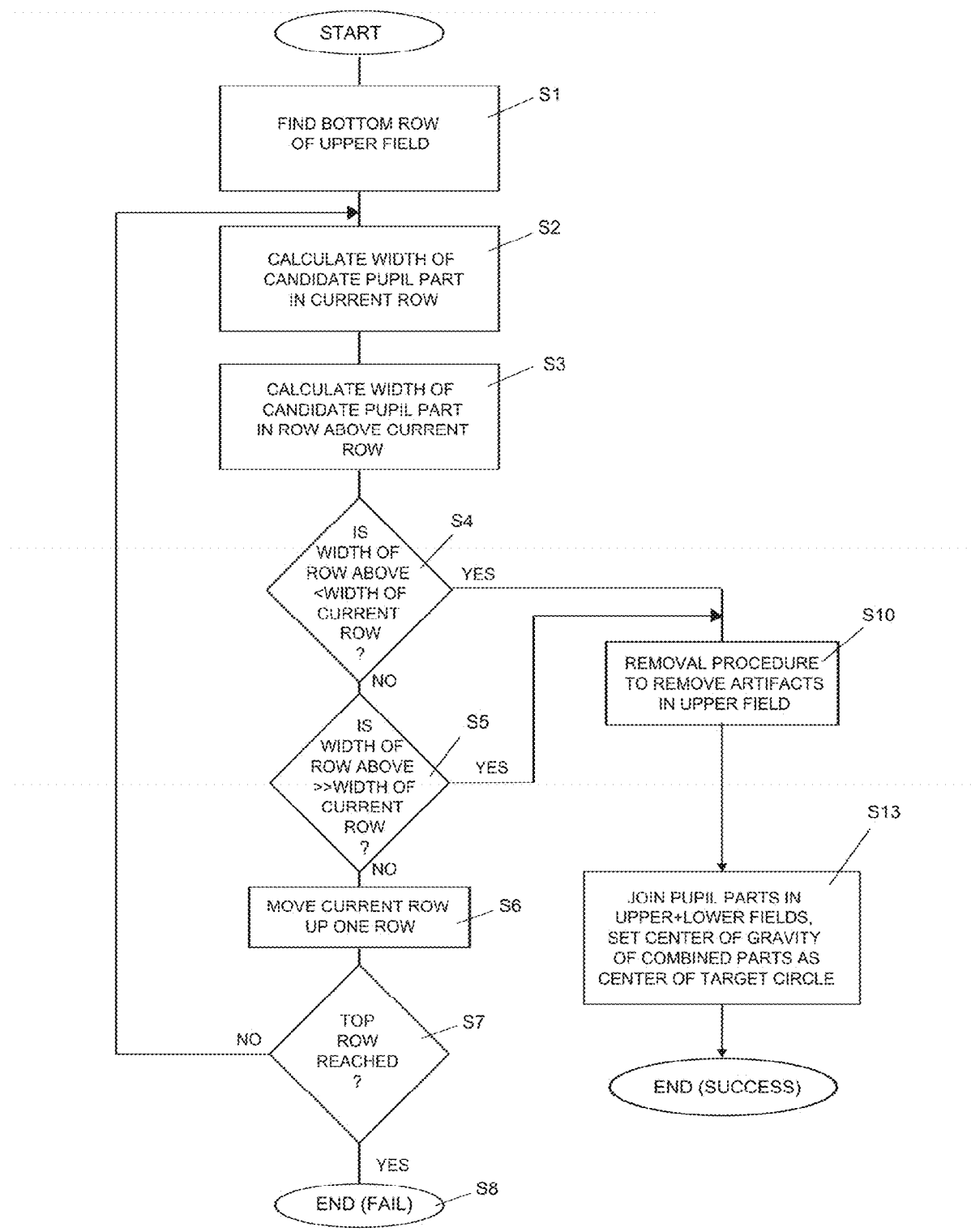
FIG. 7 presents a flowchart for use in explaining a pupil detection method according to a second embodiment of the present invention.

Referring now to FIG. 7, steps in FIG. 7 which are the same as steps in FIG. 2 are denoted by the same reference numerals. The differences are (i) that step S1' of FIG. 7 replaces step S1 in FIG. 2; (ii) the removal step is mandatory; (iii) the center of the target circle is determined in a new step S13 which follows S10 (step S9 of FIG. 2 is not used); and (iv) when the outcome of step S5 is "YES" in FIG. 7 processing goes to step S10 rather than to step S8 as in FIG. 2.

In step S1' the bottom row of the upper field is found. The algorithm analyzes the second region (upper half) starting from the bottom row and proceeds row by row in the upward direction to the top. As in the first embodiment, when the width of the candidate pupil part in the row immediately above the current row is lower than the width of the candidate pupil part in the current row, then the algorithm stops.

Thus, if the dividing line between the first and second regions is below the true horizontal diameter of the real pupil the algorithm continues until such time as the true horizontal diameter is found (the uppermost row where the condition "YES" in S4 in FIG. 7 is satisfied). If the dividing line between the first and second regions coincides with the true horizontal diameter of the real pupil the algorithm stops immediately according to the condition "YES" in S4 in FIG. 7.

Even if the dividing line is above the true horizontal diameter of the real pupil, the algorithm stops immediately according to the condition S4 from FIG. 7. In this case, of course, the true horizontal diameter is not found but this is not a problem because in the present embodiment the center of the current row is not set as the center of the pupil. Next, the semicircle is defined above the longest row assumed to be the diameter, and second region artifacts outside the semicircle are removed or ignored.

The lower pupil portion (already free of artifacts) is joined to the upper pupil portion and the center of gravity is calculated for both pupil portions.

In step S10 the procedure of eliminating artifacts may be applied or not, depending on the circularity of the object in question. In a preferred embodiment circularity is determined as follows.

Figure 5:
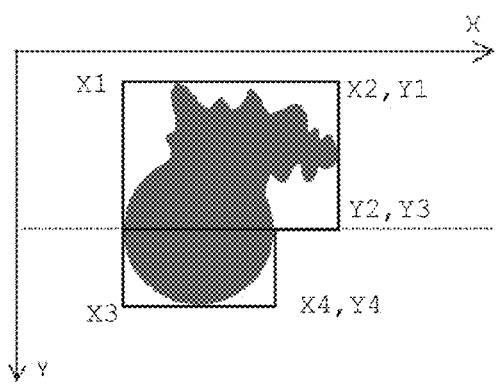
FIG. 5 is a diagram for use in explaining a method of estimation of the circularity of the image of the pupil.

Referring to FIG. 5 let us assume that the binary image of the pupil is affected by some artifacts in the upper portion. The algorithm will analyze upper portion and lower one in the same manner by finding the rectangles which comprise the segmented features (e.g. pupil and the artifacts). The image region (second image region) corresponding to the upper part of the pupil lies within range X1 . . . X2 in the horizontal direction and within range Y1 . . . Y2 in the vertical direction, and the image region (first image region) corresponding to the lower part of the pupil lies within ranges X3 . . . X4 and Y3 . . . Y4.

The algorithm then calculates the two coefficients C1 and C2:

$$C1=((Y2-Y1)+(Y4-Y3))/(X4-X3)$$

$$C2=||X4-X2|-|X3-X1||$$

Practically it is effective when the system starts the procedure of removing interferences (step S10) when C1 is greater than approximately 1.2 or C2 is greater than approximately 20 (e.g. pixels).

Figure 6:
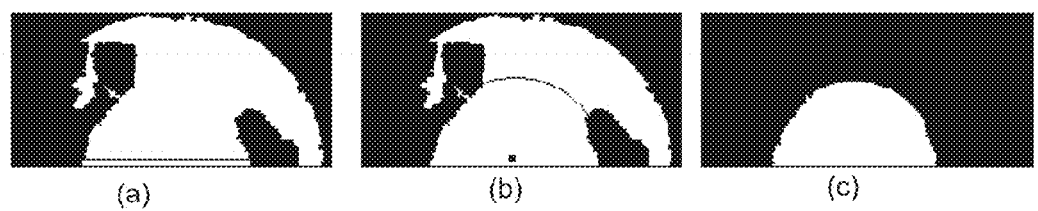
FIG. 6(a) to (c) presents views of an image region corresponding to an upper part of the pupil for use in explaining steps of the removal procedure applied to the upper part of the pupil in one embodiment of the present invention.

The removal procedure starts in the horizontal row (the longest row found in the second image region). The length of the row is calculated. With every iteration, the row is changed to the next upper one, and treated as a chord of the circle (see FIG. 6(a)). Assuming that the length of the longest row designates the length of a diameter of a circle, one can calculate length of each chord using a circle equation. Then every bright pixel beyond the current chord of the circle is swapped to dark (FIGS. 6(b), 6(c)).

Thus, in this embodiment, the second image region corresponding to the upper part of the pupil is analysed and corrected but no analysis or correction of the first image region corresponding to the lower part of the pupil is carried out. This saves processing time and complexity, which is useful in real-time implementations.

After the removal procedure is performed on second image region and the lower pupil portion is joined to the upper pupil portion, the bright pixels in the image represent only the pupil, so the center of gravity of these bright pixels gives accurate information about position of the center of the pupil. This is an alternative to using the center of the longest row, as described above. The system is capable of tracking movement of the eye using this information.

Incidentally, when the true horizontal diameter lies in the first image region (lower field), the assumption specified above that the length of the longest row designates the length of a diameter of a circle is not strictly valid. Thus, when the circle equation is applied, the chords in the second image region (upper field) will be longer than they would have been had the true diameter been found. As a result, some bright pixels representing artifacts that should have been swapped to dark pixels will remain. None the less, because the first image region (lower field) has more bright pixels in this case (the true diameter is in the lower field), the overall center of gravity of the bright pixels shifts downward despite the remaining artifacts in the second image region (upper field). Thus, the final error, if any, is tolerable.

It will be appreciated that methods embodying the present invention may be computer-implemented methods. Thus, the present invention extends to a program which, when executed by a computer or processor, causes the computer or processor to carry out any of the methods described hereinbefore.

Such a program may be provided by itself or may be carried in, by or on a carrier medium.

The carrier medium may be a storage medium or recording medium, in particular a computer-readable storage medium.

Examples include a hard disk drive, DVD, or memory device.

The carrier medium may also be a transmission medium such as a signal. Thus, a program embodying the present invention may be distributed, downloaded or uploaded in the form of a signal through a network including the Internet.

The program may be non-transitory.

Although various embodiments that incorporate the teachings of the present invention have been shown, those skilled in the art can readily devise many other varied embodiments that still incorporate these teachings.

What is claimed is:

1. A method of detecting a pupil in an image of an eye, comprising:
    identifying pixels having characteristics consistent with a pupil;
    searching line by line for a longest line in the image, the longest line being a line having the largest number of identified pixels having characteristics consistent with the pupil among lines extending in a predetermined direction in the image; and
    using the longest line to determine a size and/or position of the pupil,
    wherein the searching is conducted in a first region of the image, which corresponds to a lower part of the pupil, in preference to a second region of the image, which corresponds to an upper part of the pupil, and
    wherein the searching continues as long as the number of identified pixels in the line is increasing.

2. A method as claimed in claim 1, comprising using a length of the longest line to determine a diameter or radius of the pupil.

3. A method as claimed in claim 1, comprising using a centre position of the longest line to determine a centre of the pupil.

4. A method as claimed in claim 1, wherein the predetermined direction is the horizontal direction and each said line is a horizontal row.

5. A method as claimed in claim 1, wherein said longest line is the line having the largest number of consecutive such identified pixels among said lines extending in said predetermined direction in the image.

6. Method as claimed in claim 5, comprising interrupting the search when the number of such identified pixels is significantly larger than the number in previous line and designating the length of the longest line as a length of the penultimate searched line.

7. Method as claimed in claim 1, wherein searching for the longest line in the image is directed only to the longest fragment of the line.

8. A method as claimed in claim 4, wherein the search is conducted horizontal row by horizontal row, starting in the first region.

9. A method as claimed in claim 8, comprising starting the search in a horizontal row of the first region that is farthest from the second region and going horizontal row by horizontal row towards the second region.

10. A method as claimed in claim 1, wherein the image is a split image captured by an image capturing device having a split prism rangefinder, and the said predetermined direction coincides with the direction of a split line between the two fields of the split image.

11. A method as claimed in claim 10, wherein said longest line is the line having the largest number of consecutive such identified pixels among said lines extending in said predetermined direction in the image.

12. A method of detecting a pupil in an image of an eye, comprising:
    analysing the image which is split into first and second regions, the first region of the image corresponding to a lower part of the pupil and the second region of the image corresponding to an upper part of the pupil,
    wherein the analysis comprising:
        i. starting from a lowest row of the second region, and working upwards row by row, identifying portions of the image that are candidate portions of the pupil;
        ii. identifying a row at which the identified portions start to decrease in length; and
        iii. determining a location of the pupil based on the identified row.

13. An apparatus for detecting a pupil in an image of an eye, comprising:
    an identifying unit configured to identify pixels having characteristics consistent with a pupil;
    a search unit configured to search line by line for a longest line in the image, the longest line being the line having the largest number of identified pixels having characteristics consistent with the pupil among lines extending in a predetermined direction in the image;
    a determination unit configured to use the longest line to determine a size and/or position of the pupil,
    wherein the search unit is configured to conduct the search in a first region of the image, which corresponds to a lower part of the pupil, in preference to a second region of the image, which corresponds to an upper part of the pupil, and to continue the search as long as the number of identified pixels is increasing.

* * * * *